(12) United States Patent
Zeigler

(10) Patent No.: US 7,261,912 B2
(45) Date of Patent: Aug. 28, 2007

(54) METHOD OF PRODUCING USEFUL PRODUCTS FROM SEAWATER AND SIMILAR MICROFLORA CONTAINING BRINES

(76) Inventor: Arthur William Zeigler, 231 11th St. P. O. Box 6, Raymond, WA (US) 98577-0006

( * ) Notice: Subject to any disclaimer, the term of this patent is extended or adjusted under 35 U.S.C. 154(b) by 0 days.

(21) Appl. No.: 11/228,939

(22) Filed: Sep. 16, 2005

(65) Prior Publication Data
US 2006/0105082 A1 May 18, 2006

Related U.S. Application Data

(60) Provisional application No. 60/629,541, filed on Nov. 18, 2004.

(51) Int. Cl.
*A23L 1/304* (2006.01)

(52) U.S. Cl. ............ 426/422; 426/425; 426/464; 71/11; 71/23; 71/25

(58) Field of Classification Search .......... 426/422, 426/425, 464; 71/11, 23, 25
See application file for complete search history.

(56) References Cited

U.S. PATENT DOCUMENTS

| 2,404,550 | A |   | 7/1946  | Thomsen         |        |
|-----------|---|---|---------|-----------------|--------|
| 2,606,839 | A |   | 8/1952  | Evans           |        |
| 2,934,419 | A | * | 4/1960  | Cook            | 71/1   |
| 3,071,457 | A |   | 1/1963  | Murray          |        |
| 3,374,081 | A | * | 3/1968  | Miller          | 71/11  |
| 3,775,132 | A | * | 11/1973 | Richards, Jr.   | 426/656|
| 4,015,971 | A |   | 4/1977  | Barannik et al. |        |
| 4,448,682 | A | * | 5/1984  | Moritz          | 210/101|
| 4,634,533 | A |   | 1/1987  | Somerville      |        |
| 5,074,901 | A |   | 12/1991 | Alderman        |        |
| 6,147,229 | A | * | 11/2000 | Rasmussen et al.| 549/393|

\* cited by examiner

*Primary Examiner*—Helen Pratt

(57) ABSTRACT

A process is provided for the recovery of useful products, including fertilizers and nutritional supplements, from the organic matter and minerals contained in seawater and other brines. The dissolved organic carbon-based chemicals and suspended particulate carbon-based organic matter are co-precipitated together with the contained magnesium and/or calcium, along with incidental trace minerals, entrained water and water of hydration. An alkali base and/or alkaline earth base are added to the brine until a pH of 10.75 to 11.0 is achieved. The settled or non-dry filtered or centrifuged precipitate is utilized as a slurry and the supernatant brine is discarded.

6 Claims, 1 Drawing Sheet

FLOW CHART

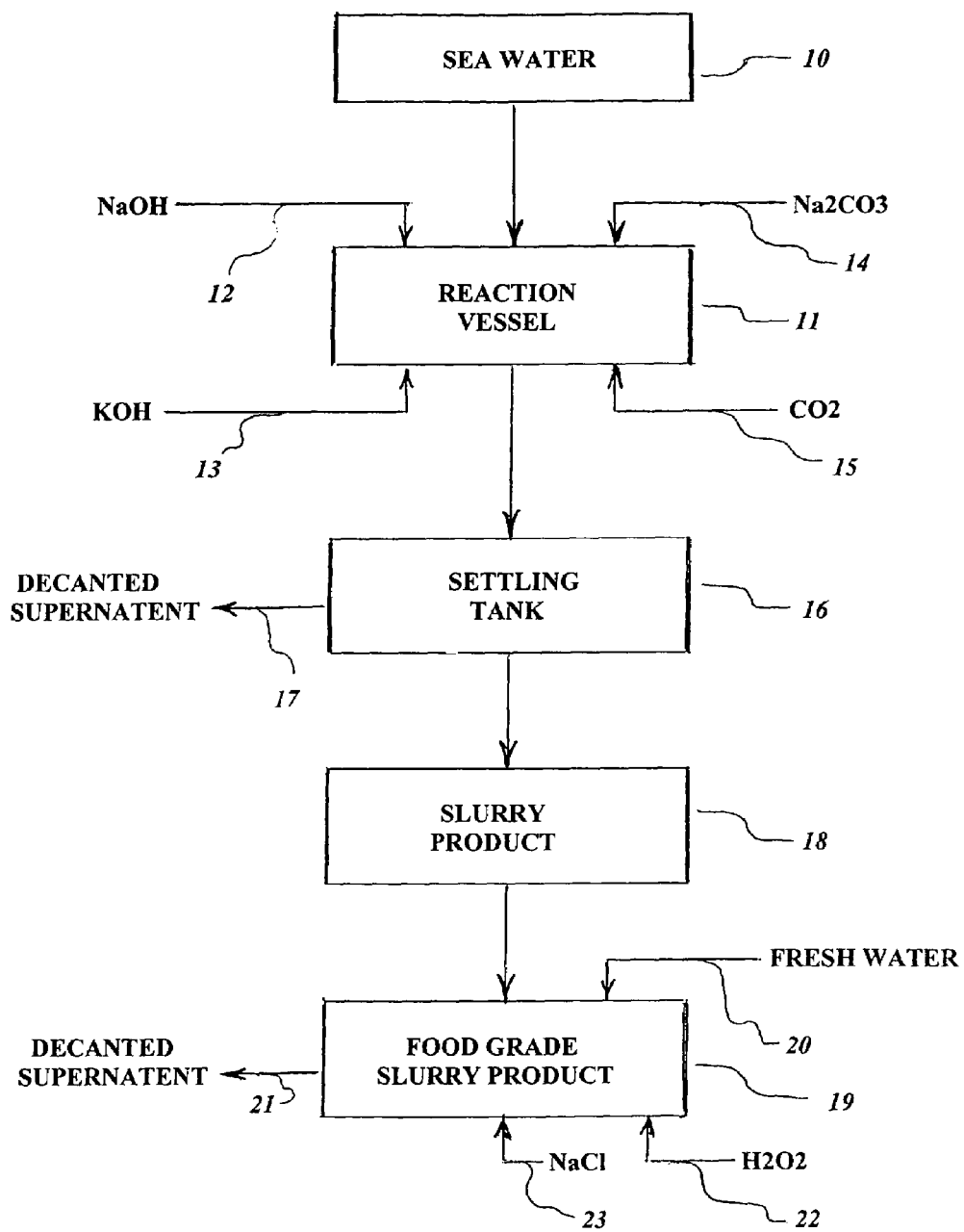
FLOW CHART  FIGURE 1

METHOD OF PRODUCING USEFUL PRODUCTS FROM SEAWATER AND SIMILAR MICROFLORA CONTAINING BRINES

CROSS REFERENCE TO RELATED APPLICATIONS

This application is based on provisional application Ser. No. 60/629,541, filed on Nov. 18, 2004.

STATEMENT REGARDING FEDERALLY SPONSORED RESEARCH OR DEVELOPMENT

Not Applicable

Description of Attached Appendix

Table 1. A list of experimental poofs of the efficacy of the invention.

BACKGROUND OF THE INVENTION

This invention relates generally to the fields of chemical extraction, fertilizers and nutritional supplements and more specifically to a METHOD OF PRODUCING USEFUL PRODUCTS FROM SEAWATER AND SIMILAR MICROFLORA CONTAINING BRINES.

For thousands of years mankind has utilized the minerals and vegetable products of the oceans for both food and fertilizer.

Even to this day sea salt is prized for its trace mineral content and kelp products are used as both food and fertilizer in many parts of the world.

The present invention bonds both dissolved carbon-based organic chemicals and suspended carbon-based organic particles to hydroxide precipitates of marine minerals.

They are bonded ionically, mechanically, electrostatically or otherwise.

For the bulk of dissolved organic carbon in the ocean, chemical structure and basic biochemical parameters are largely unknown.

Fulvic acid which is ubiquitous at low concentrations in all parts of the ocean consists of many thousands of different organic substances of both marine derived and terragenous origin.

Not only are the compositions of these substances largely unknown, so are their physical properties.

It is known that some of these substances, especially exopolysaccharides, are capable of spontaneous polymerization with the production of jelly-like layers covering several square miles.

Dimethylsulfoniopropionate, a substance produced by phytoplankton for osmotic control, is generated in such quantities that some of its decomposition products are considered to have a major effect on planetary weather. It is known to have a kosmotropic effect on water molecules.

Other of the dissolved organic substances organize water molecules into liquid and solid phase clathrates and quasi-clathrates.

A new class of highly abundant, nonliving organic marine particles has recently been recognized.

These colloidal particles consist primarily of exopolymers released as exudates by phytoplankton and bacteria. These exopolymer particles have been found to be present in seawater ranging up to 5,000 particles per ml and varying in size from 3 to 100 nanometers.

They are characterized as containing large amounts of water which has been organized by the organic matter. It is postulated that this ability of dissolved and particulate organic matter in the oceans to organize and add structure to water molecules is, at least in part, responsible for the observable and measurable biological effects of the present invention on plant, animal and human life.

In the past, minerals have been extracted from seawater for fertilizer and nutritional supplementation or the organic content has been extracted separately for the same purpose.

To the best of the inventors knowledge, no one has previously, intentionally extracted the two together for the synergistic effect which they have in combination when used as a slurry.

U.S. Pat. No. 3,374,081 is a method of separating minerals from seawater which are suitable for use as fertilizers and animal feeds. It employs added proteinaceous materials to precipitate minerals as chelated complexes. The teaching of this patent is to add organic materials to a brine with the goal of forming a precipitate of metal proteinates.

The methods employed and precipitates obtained are of very different nature than those of the present invention.

U.S. Pat. No. 2,606,839 employs methods similar to the current invention for the purpose of producing a pure sodium chloride product.

The patent shows no awareness of the valuable nature of the byproduct for the applications claimed by the present invention.

U.S. Pat. No. 3,071,457 describes a method of evaporating seawater to dryness for application of the resultant solids as fertilizer.

This product very successfully increased crop yields but required application rates of 550 to 2,200 pounds of sea solids per acre.

The first paragraph of this patent states that it relates only to the inorganic salts contained in seawater.

U.S. Pat. No. 2,404,550 uses methods similar to the current invention but uses them for the purpose of extraction and purification of mineral salts from the waters of the Great Salt Lake.

One of its aims is the separation and exclusion of organic content from the final product. Testing of the present invention has demonstrated that purified minerals extracted from brines do not have the desired effects.

U.S. Pat. No. 2,934,419 uses methods similar to the current invention but differs in two very important respects. No mention is made of organic content and the mineral precipitates are dried. Testing of the current invention has shown that if the precipitates are dried they can no longer significantly stimulate plant growth.

U.S. Pat. No. 4,634,533 uses methods similar to the current invention to recover useful products such as fertilizer, animal feed supplements and mineral salts from brines. It differs in two important respects. It makes no mention of the organic chemical constituents of the brine.

It requires the addition of a phosphorous source in order to have the claimed benefit as a fertilizer.

U.S. Pat. No. 4,015,971 has the object of producing fertilizers from seawater containing "microelements and active organic substances".

This is accomplished by adding bivalent iron ions to the seawater so that the organic substances are co-precipitated with the iron hydroxides. It does not utilize the contained magnesium and calcium brine constituents as does the present invention. The patent claims 5% to 10% increased crop yields with application rates of 0.5 to 3 kg of dried solids per hectare.

On this basis it is both less effective and less economical than the present invention.

U.S. Pat. No. 5,074,901 is a method for producing a liquor from seawater by achieving a 90% reduction of the original volume through evaporation.

Although the patent states that this Liquor, when diluted, will function as a fertilizer, its nature is very different from the liquor produced by the current invention.

U.S. Pat. No. 6,147,229 describes a method of producing magnesium fulvate from humus material. It involves digesting the humus in a solution of sodium hydroxide, then acidifying to precipitate humates followed by the addition of magnesium hydroxide to the supernatent in order to precipitate magnesium fulvate.

The current invention extracts magnesium fulvate from seawater in a single step by the addition of sodium hydroxide, which precipitates the contained magnesium as hydroxide that in turn precipitates the contained fulvates as magnesium fulvate.

These prior usages have not recognized the benefits, economies and synergies that can be achieved by using the magnesium and/or calcium constituents of the sea water and similar brines to co-precipitate and recover in usable form, the organic chemical and particulate organic content of said brines. Furthermore, they did not recognize that the resultant precipitates are most bioactive in slurry form. That they did not do so indicates that such usage is unobvious.

BRIEF SUMMARY OF THE INVENTION

The primary object of the invention is to extract, from seawater and similar microflora containing brines, its dissolved, carbon-based, organic chemicals and particulate carbon-based organic matter together with the contained bivalent minerals and incidental trace minerals, entrained water and water of hydration, so that these substances may be applied to beneficial use.

Another objective of the invention is to produce from seawater and similar brines an economical and efficacious fertilizer and plant growth stimulant which would contain microelements and active organic substances.

Another objective of the invention is to produce a nutritional supplement from seawater and similar brines that will promote health and growth in animals and humans.

An advantage of the invention is that it will produce magnesium fulvate from seawater and similar brines in a single chemical operation.

Other objects and advantages will become apparent from the following descriptions, taken in connection with the accompanying drawing, FIG. 1, wherein by way of illustration and example, an embodiment of the present invention is disclosed.

In accordance with a preferred embodiment of the invention, there is disclosed a method of co-precipitating the carbon-based organic chemicals and carbon-based particulate matter contained in seawater and similar brines together with its constituent, bivalent magnesium and/or calcium and incidental trace minerals, entrained water and water of hydration.

In accordance with a preferred embodiment of the invention, there is disclosed a method for producing from seawater and similar brines, an economical and efficacious fertilizer and plant growth stimulant, which utilizes both the organic substances and constituent bivalent minerals which may be co-precipitated from said brines together with trace minerals, water of hydration and entrained waters.

In accordance with a preferred embodiment of the invention, there is disclosed a method for producing from seawater and similar brines, a health and growth promoting nutritional supplement, which utilizes both the organic substances and constituent bivalent minerals which may be co-precipitated from said brines along with trace minerals, water of hydration and entrained waters.

BRIEF DESCRIPTION OF THE DRAWING

FIG. 1 is a process flow chart.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details enclosed herein are not to be interpreted as limiting, but rather as a basis for the claims and as a representative basis for teaching one skilled in the art to employ the present invention in virtually any appropriately detailed system, structure or manner.

As illustrated in the drawing FIG. 1, the seawater 10 is treated in a reaction vessel 11, with caustic soda (NaOH), or any other base or alkaline earth base that yields hydroxyl ions on hydrolysis. The caustic soda is indicated in the drawing as being fed through line 12, to the reaction vessel, 11. The concentration of the caustic soda is such that the number of hydroxyl ions added from line 12 is chemically equivalent to the total concentration of the magnesium ions present in the seawater from the source, 10. As a practical application, caustic soda is added until a pH of 10.75 to 11.0 is achieved. Soda ash (Na2CO3) or any other alkali carbonate or alkaline earth carbonate is added to the seawater in reaction vessel 11, in such concentration that the carbonate ions are chemically equivalent to the calcium ions present in the seawater. The soda ash is schematically indicated on the drawing as being added to the reaction vessel 11, through line 14, and such addition may be simultaneously with, or at different times from, the addition of the caustic soda. Preferably, the seawater with the caustic soda and soda ash added thereto is agitated in the reaction vessel 11, to complete the dissolving and reaction of the chemicals.

A precipitation occurs within a few minutes after the addition of chemicals to the reaction vessel 11, from lines 12 and 14 and such precipitate is for the most part, magnesium hydroxide and calcium carbonate. The surface area of such magnesium hydroxide precipitates is tremendous, largely due to the fact that it precipitates out in very small particles. The calcium carbonate precipitate also has a very large surface area. The magnesium hydroxide and calcium carbonate precipitates absorb trace elements in the seawater on their large surface areas and thereby trace elements are also separated from the seawater. Fulvates are precipitated as magnesium fulvate. Most importantly, substantially all of the dissolved organic carbon-based chemicals and particulate carbon-based organic matter are co-precipitated together with the magnesium hydroxide and calcium carbonate and bonded to their surface either mechanically, ionically or electrostatically. They can thus be separated from the seawater together with their waters of hydration.

Another preferred embodiment of the invention, which will achieve the same result as the preceding description, would be as illustrated in FIG. 1, to treat the seawater 10, in reaction vessel 11, with caustic soda or any other base or alkaline earth base that yields hydroxyl ions on hydrolysis. The caustic soda (NaOH) is indicated in the drawing as being fed through line 12, to the reaction vessel 11. The concentration of the caustic soda is such that the number of hydroxyl ions added from line 12, is chemically equivalent to the total concentration of the magnesium ions present in the seawater from the source, 10. As a practical application, caustic soda is added until a pH of 10.75 to 11.0 is achieved. Next, the liquor in reaction vessel 11, is agitated and carbon dioxide gas is introduced through supply pipe 15, in an amount sufficient to precipitate all of the contained calcium as calcium carbonate.

Another preferred embodiment of the invention, which will extract and recover all of the organic carbon contained in the seawater, would be as illustrated in FIG. 1, to treat the seawater 10, in reaction vessel 11, with caustic soda (NaOH) as indicated in the drawing as being supplied through line 12 to the reaction vessel 11. The concentration of the caustic soda is such that the number of hydroxyl ions added from line 12, is chemically equivalent to the total concentration of magnesium ions present in the seawater from the source, 10. Potassium hydroxide is also added, as indicated in FIG. 1, through supply line 13. The KOH is supplied in sufficient quantity to convert all of the calcium contained in the liquor being treated in reaction vessel 11, into calcium hydroxide. As a practical application, but not limited to this example, the sodium hydroxide can be supplied, together with the potassium hydroxide, in a ratio of 95% sodium hydroxide to 5% potassium hydroxide. This blend is supplied to the reaction vessel 11, until a pH of 10.75 to 11.0 is achieved.

All of the examples given as preferred embodiment will achieve substantially the same results, as far as co-precipitating together with the magnesium and calcium, substantially all of the dissolved carbon-based chemicals and carbon-based particulate organic matter contained in the seawater feed illustrated as 10, in FIG. 1.

Once the precipitation is achieved in the reaction vessel 11 by the chosen method, the liquor is allowed to stand quietly for a period of time so that the precipitates may settle. In a preferred embodiment of the invention as illustrated in FIG. 1, the liquor is allowed to rest in settling tank 16, for 48 hours and the supernatant solution, 17, is then decanted and discarded. The settled precipitates are the valuable product illustrated in FIG. 1, as 18, the slurry product.

Seed germination tests done by the inventor have shown that if the slurry is allowed to dry out, it losses its potency even if rehydrated. Other tests have shown that it is the presence of the organic content together with the bivalent marine minerals which make the slurry product effective. A slurry of pure magnesium and/or calcium hydroxide will not produce the beneficial effects on plant and animal life that the slurry produced by the present invention does.

If it is desired to alter the characteristics of the slurry product identified as 18 in FIG. 1, minerals or other substances with the desired attributes may be added before and/or after precipitation. For example, bivalent iron could be added to feed 10 and it would be precipitated along with the other minerals as hydroxide. For special applications, any number of minerals or other substances can be added before and/or after precipitation to give desired characteristics to the slurry product.

In a preferred embodiment of the invention, the precipitates will contain from 10 to 50 grams per liter of total suspended solids, although other proportions may be achieved if so desired.

The slurry is stored in opaque containers away from direct sunlight and strong electromagnetic fields, which may cause the loss of potency.

As a fertilizer and plant growth stimulant, in a preferred embodiment the slurry is added to the growth medium at the rate of one or more gallons per acre.

In another preferred embodiment of a fertilizer prepared under this invention, the slurry product illustrated in FIG. 1, as 18, and containing 20 grams of total suspended solids per liter, would be diluted with 999 parts of water so that the final solution contains 0.1% of the slurry, illustrated as 18. To this solution, any soluble nitrate fertilizer may be added at its recommended rate. The resultant solution may be added directly to the growth medium or applied as a foliar spray.

Wheat treated in this manner has yielded 36% more grain by weight than the control, which received the nitrate fertilizer only. In this test the slurry 18, was applied at the rate of one gallon per acre. Similar results have been achieved with a variety of row and orchard crops. Typical results with fruit include increased size, increased sugar content, increased overall yield and better keeping quality.

If it is desired to alter the characteristics of the agricultural slurry product, minerals or other substances with the desired attributes may be added before and/or after precipitation. For example, bivalent iron could be added to feed 10 and it would be precipitated along with the other minerals as hydroxide. Ionic zinc is an example of a mineral that might be added after precipitation. For special applications, any number of minerals or other substances can be added before and/or after precipitation to give desired characteristics to the agricultural slurry product.

As a preferred embodiment of a nutritional supplement for animals prepared from the slurry product identified as 18 in FIG. 1, the slurry product containing 20 grams of total suspended solids per liter is added to the drinking water or feed so that the daily dosage is one tenth to one half milliliter per kilogram of body weight.

The daily dose of this preparation is used to describe a daily dose for a primate having a body weight of 70 kgs, unless otherwise stated.

In animal testing conducted by the inventor, the above formula was used at the rate of 0.4 milliliters per kg of body weight per day to supplement the diet of white mice for a period of thirty days, after which they were subjected to forced swim testing. During the test period of 30 days the control population, consisting of 10 mice that did not receive the supplement, experienced a 30% mortality while the test population, consisting of 30 mice that received the supplementation, experienced no mortalities.

When subjected to swim testing, the mice that had received the supplementation were able to endure for a period averaging 3.23 times greater than the control population. The groups which had received the supplementation had a 3.8% greater body weight at the termination of the test than did the control population.

In a preferred embodiment of this invention to prepare a nutritional supplement for humans, the seawater feed illustrated as 10 in FIG. 1, would be filtered before being placed in the reaction vessel 11, in order to remove any extraneous material. The final slurry product 18 would undergo additional processing to become the food grade slurry product identified in FIG. 1 as 19. The slurry would be rinsed by diluting to five times its volume with fresh water and allowed to settle. This is illustrated in FIG. 1 with the fresh water shown as being supplied by line 20.

After 48 hours the supernatant would be discarded as shown in FIG. 1 by line 21 and sodium chloride would be added at the rate of one gram per liter and this is illustrated in FIG. 1 as being supplied by line 23. The resultant liquor may be further sterilized before bottling by boiling for 10 minutes and, after boiling and being allowed to cool, an addition of 35% hydrogen peroxide is made at the rate of 2 milliliters per gallon of liquor. The H2O2 is shown in FIG. 1 as being supplied by line 22. Total suspended solids in the food grade slurry will vary between 7 and 20 grams per liter and may be otherwise concentrated or diluted.

This liquor may be used as a beverage or added to food to promote health and vigor. In a preferred embodiment of packaging, after bottling, the food grade slurry would be over-packed in metalized plastic film or anti-static protective bags such as is used for shipment of computer parts. Alternatively a metalized bottle could be used or metal foil could be utilized as an outer cover. These measures allow the product to be stored and shipped without loss of potency.

If it is desired to alter the characteristics of the food slurry product identified as 19 in FIG. 1, minerals or other substances with the desired attributes may be added before and/or after precipitation. For example, bivalent iron could be added to feed 10 and it would be precipitated along with the other minerals as hydroxide. For special applications, any number of minerals or other substances can be added before and/or after precipitation to give desired characteristics to the slurry product. Ionic cobalt and iodine are examples of minerals that might be added after precipitation.

With respect to all methods disclosed herein, all steps, procedures or processes may be considered to be done without regard to the priority unless specified, or dictated by necessity or force of logic. The identification of steps or products in any priority is done only for the purpose of introducing them and distinguishing them from one another, unless otherwise dictated by necessity or force of logic.

The foregoing is offered primarily for purposes of illustration. It will be readily apparent to those skilled in the art that the proportions, material, formulation procedures, administration protocols and other parameters of this invention may be further modified or substituted in various ways without departing from the spirit and scope of the invention.

While the invention has been described in connection with a preferred embodiment, it is not intended to limit the scope of the invention to the particular form set forth, but on the contrary, it is intended to cover such alternative, modifications, and equivalents as may be included within the spirit and scope of the invention as defined by the appended claims.

Table 1 Experimental Proofs

Our agricultural research has established the following data:
1. Seeds treated with the invention and germinated in a closed container consumed 118% more oxygen in the first 24 hours than did the control. This test of aerobic cellular respiration shows that independent of all other factors, cellular respiration of the plant is increased.
2. Yeast introduced to the invention in sugar water and placed in a sealed container generated one third more CO2 in the first 24 hours than the untreated control. This test of anaerobic cellular respiration shows that independent of what is happening in the plant; increased cellular respiration will take place in microorganisms in treated soil.
3. Treated soil in which wheat was germinated and grown out for 20 days was analyzed by a soil laboratory. The test showed that the invention gave an increase of total bacterial biomass 32% greater than fertilizer alone did. The test also showed that the treated soil had an increase of total fungal biomass. The increase over baseline was 264% greater with the invention than fertilizer alone achieved.
4. Brix refractometer testing of the sap from all of the various species being trialed has shown at least a 30% greater content of dissolved solids, primarily sugars, in the sap of the treated plants when compared to the controls. This can only be achieved through increased photosynthesis.

Taken together the data indicate the following:
A. All species of plants, when treated with the invention, will gain the benefit of more energy through increased cellular respiration and increased photosynthesis.
B. Soil health and vitality of the treated soil will be greatly increased due to greater microorganism growth and content.
C. As a consequence of points A. and B., those species of plants that have a symbiotic relationship with mycorrhizal fungi should experience increased yields in direct proportion to each species degree of dependence upon the mycorrhizal relationship.

This hypothesis is validated by the following test data: Potato trials indicate achievable yield increases in the vicinity of 100% over and above what fertilizer alone can produce. Wheat trials show increases of 25% to 45%. Other species show a similar pattern.

The fungi obtain carbohydrates and growth factors from the roots of the plants. As the invention increases these carbohydrates in the sap by over 30%, and at the same time increases the cellular respiration of the soil microorganisms, a previously unattainable synergy is achieved. This accounts for much of the enhanced yields and plant health that we have observed.

Animal Testing

The Method:
Four week old white mice were obtained and split into two populations. The control population consisted often mice and the other group consisted of thirty mice.

All populations were given measured amounts of the same food and measured amounts of water daily. The mice in the test population were also each given five drops of the formula in their water every day for thirty days.

During the first week of the test there was a 30% mortality for the control population but no deaths occurred in the group receiving supplemention with the invention.

Termination:
At the end of 30 days the mice were subjected to forced swim testing to the point of terminal exhaustion and death.

The Results:
1. The control group, that had not received supplementation, endured for an average of 257 minutes, or 4 hours and 17 minutes.

2. The test population, that had received the invention endured for an average of 830 minutes, or 13 hours and 49 minutes.

Observations:

The test population, that received supplementation exhibited more stamina than the control group by enduring the forced swim testing for a much greater duration.

Conclusions:

Supplementation with the invention as performed in this study greatly enhances stamina.

What is claimed is:

1. A method for harvesting aquatic microflora and the byproducts of their lifecycles from seawater by co-precipitation together with the brine's constituent bivalent minerals, substantially all naturally occurring organic matter along with incidental trace minerals, entrained water and water of hydration comprising:

adding colloidal silica to the seawater or brine, whereby an additive or synergistic alteration of the bioactivity of precipitates is achieved, further, treating seawater or other similar brine containing colloidal silica and aquatic microflora with an alkali base or alkaline earth base, precipitating the naturally occurring carbon-based chemicals and carbon-based particulate matter along with entrained water and water of hydration, phytoplankton, phytobacter, nanobacter, viruses and virus like particles together with the byproducts of their life-cycles and concentrating to the degree desired by decantation or centrifugation.

2. A method under claim 1 for producing a new composition of matter from seawater or brines containing aquatic microflora comprising:

the precipitates produced as in claim twenty six comprise a new composition of matter, an intimate mixture of the naturally occurring bivalent minerals of the brine co-precipitated and condensed together with, incidental trace minerals, substantially all naturally occurring carbon-based chemicals and carbon-based particulate matter along with entrained water, water of hydration, phytoplankton, phytobacter, nanobacter, viruses and virus-like particles together with the byproducts of their life-cycles, said new composition of matter containing up to one billion bacteria and ten billion viruses and virus-like particles per tablespoon-full, the entrained waters, in the form of clathrates, quasi-clathrates and hydrogels, being an inextricable constituent of the new composition of matter.

3. A method for harvesting aquatic microflora and the byproducts of their life cycles from seawater by co-precipitation together with the brine's constituent bivalent minerals, substantially all naturally occurring organic matter along with incidental trace minerals, entrained water and water of hydration comprising: treating seawater or similar brine containing aquatic microflora with an alkali base or alkaline earth base, precipitating the naturally occurring carbon-based chemicals and carbon-based particulate matter along with entrained water and water of hydration, phytoplankton, phytobacter, nanobacter, viruses and virus-like particles together with the byproducts of their life-cycles, adding colloidal silica to the precipitate, whereby an additive or synergistic alteration of the bioactivity of the precipitates is achieved, and concentrating to the degree desired by decantation or centrifugation.

4. A method for harvesting aquatic microflora and the byproducts of their life cycles from seawater by co-precipitation together with the brine's constituent bivalent minerals, substantially all naturally occurring organic matter along with incidental trace minerals, entrained water and water of hydration comprising: treating seawater or similar brine containing aquatic microflora with an alkali base or alkaline earth base, precipitating the naturally occurring carbon-based chemicals and carbon-based particulate matter along with entrained water and water of hydration, phytoplankton, phytobacter, nanobacter, viruses and virus-like particles together with the byproducts of their life-cycles, and adding to the precipitate mucopolysaccharides from the group consisting of arabinogalactin or acemannan, whereby an additive or synergistic alteration of the bioactivity of the precipitates is achieved, and concentrating to the degree desired by decantation or centrifugation.

5. A method for harvesting aquatic microflora and the byproducts of their life cycles from seawater by co-precipitation together with the brine's constituent bivalent minerals, substantially all naturally occurring organic matter along with incidental trace minerals, entrained water and water of hydration comprising: adding humates and or fulvates to the seawater or similar brine, treating the seawater or similar brine containing the humates and/or fulvates and aquatic microflora with an alkali base or alkaline earth base, precipitating the naturally occurring carbon-based chemicals and carbon-based particulate matter along with entrained water and water of hydration, phytoplankton, phytobacter, nanobacter, viruses and virus like particles together with the byproducts of their life-cycles, and concentrating to the degree desired by decantation or centrifugation.

6. A method for harvesting aquatic microflora and the by-products of their life cycles from seawater by co-precipitation together with the brine's constituent bivalent minerals, substantially all naturally occurring organic matter along with incidental trace minerals, entrained water and water of hydration comprising: treating seawater or similar brine containing aquatic microflora with an alkali base or alkaline earth base, precipitating the naturally occurring carbon-based chemicals and carbon-based particulate matter along with entrained water and water of hydration, phytoplankton, phytobacter, nanobacter, viruses and virus like particles together with the byproducts of their life-cycles, adding to the precipitate bioactive humates and or fulvates, whereby an additive or synergistic alteration of the bioactivity of the precipitates is achieved, and concentrating to the degree desired by decantation or centrifugation.

* * * * *